April 7, 1970 R. W. H. KIM ET AL 3,504,572
CAM FOR INTERMITTENT FEED MECHANISM
Filed Dec. 7, 1967 2 Sheets-Sheet 1

INVENTORS:
Raymond W. H. Kim,
Tong Soo Kim.
By William J. Rusch
John E. Peele Jr. Attys

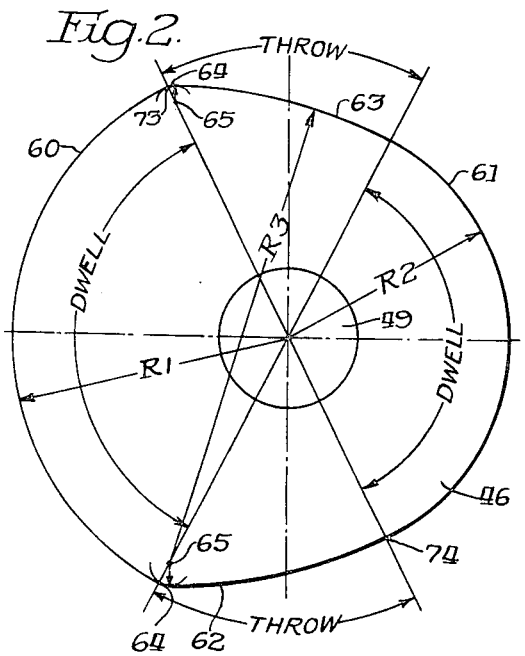
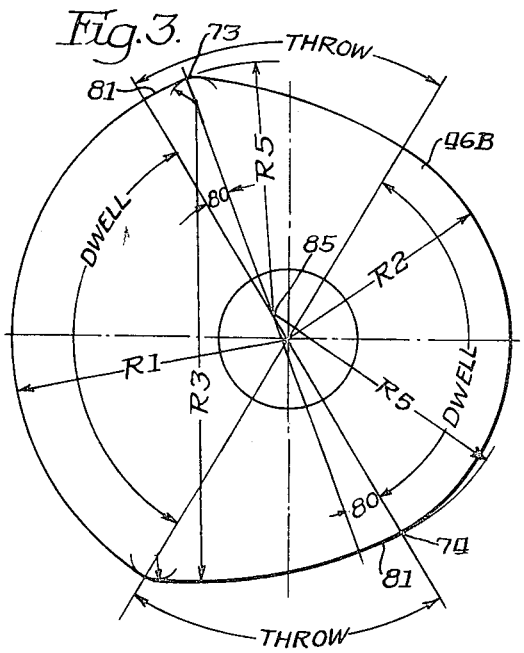
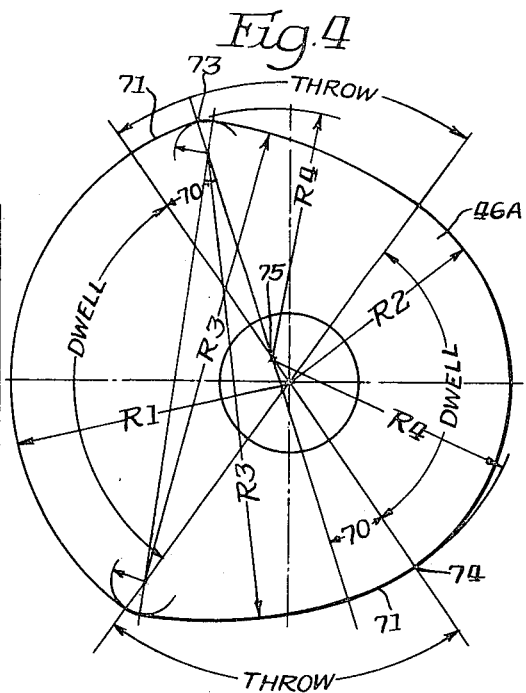
Fig. 8.
| BLACK-OUT | | | | | | TRANSMISSION |
|---|---|---|---|---|---|---|
| SHUTTER BLADE | PER CAM CYCLE | % | CAM | THROW | DWELL | |
| 50° | 150/360 | 41.7 | 46 | 54° | 126° | 58.3% |
| 55° | 165/360 | 45.8 | 46B | 62° | 118° | 54.2% |
| 59° | 177/360 | 49.2 | 46A | 70° | 110° | 50.8% |
INVENTORS:
Raymond W. H. Kim,
Tong Soo Kim
By William F. Rasch
John E. Peele Jr. Attys

United States Patent Office 3,504,572
Patented Apr. 7, 1970

3,504,572
CAM FOR INTERMITTENT FEED MECHANISM
Raymond W. H. Kim, Morton Grove, and Tong Soo Kim, Des Plaines, Ill., assignors to Bell & Howell Company, Chicago, Ill., a corporation of Illinois
Filed Dec. 7, 1967, Ser. No. 688,785
Int. Cl. F16h 53/00
U.S. Cl. 74—567                                            7 Claims

ABSTRACT OF THE DISCLOSURE

Disclosed for use in a motion picture apparatus is an intermittent film moving mechanism driven by a constant diameter cam, to produce intermittent film advancing strokes of a film engaging member. The cam construction has an improved profile for substitution for a constant width profile cam in an existing intermittent mechanism. The disclosed profile causes gradual acceleration of the cam follower during an initial period of the film advancing stroke thereby effecting a reduction in the shock occurring as the film engaging member engages perforations of the film.

---

This invention relates generally to intermittent strip fed mechanisms of the type used in motion picture projectors for intermittently feeding film frames in succession; although the invention is not limited to such use alone. Particularly, the invention concerns intermittent strip feed mechanism of the type producing intermittent film advancing or indexing strokes in a film engaging member which is driven by cam action. Specifically, the invention concerns a cam of novel profile adapted as a substitute for conventional cams heretofore suited for use in a film strip feed or indexing mechanism.

Movements of the indicated type conventionally comprise claw means arranged for motivation into and out of mesh with film perforations for the purpose of intermittently advancing a film strip as a result of vertical reciprocation of a rotational cam which correspondingly drives a claw carrier or shuttle. The cams heretofore employed are referred to as heart-shaped, circular arc or gravity cams and are symmetrical and of "constant width." Such prior cams are rotatable working between two opposed cam-confining cam followers which are arranged in fixed spaced relationship to each other. The prior cams each have a profile defined by a pair of symmetrically disposed throw surfaces comprising circular arcs of like curvature arranged between a pair of dwell surfaces, the latter being circular arcs having a common center but different radii of curvatures, the difference between which determines the magnitude of cam throw. A cam of conventional construction almost instantaneously develops maximum film advancing acceleration at the commencement of each full stroke, i.e., each time the cam points engaging the followers move from a dwell surface to a throw surface. As a consequence, repetitive film slapping noises are constantly present during usual film projection; and shock to and undesirable wear along the film margins engaged by the advancing claw means results.

In a contemporaneous applications Ser. No. 688,765, assigned to the same assignee to which the present invention is assigned, an ideal cam construction is taught which obviates the foregoing as well as other objectionable features incident to use in a strip film projector of a conventional cam for film frame indexing or film feeding. However, such ideal cam construction necessitates modifying the size of all related components presently employed with a cam of conventional profile. Therefore, a conventional cam cannot merely be replaced by an ideal cam in a conventional projector whose parts are proportioned for use with such conventional cam.

In accordance with the present invention and as an object thereof, there is provided a cam construction having an improved profile which is adapted for substitution of a cam of conventional profile in an intermittent strip film feed mechanism of the indicated class without the requirement of adjusting or reproportioning cam related components.

It is additionally an object of the invention that the profile in such improved cam construction be such that it will cause gradual acceleration of the cam follower during an initial period of the film advancing stroke to minimize shock, noise and undesirable wear along the claw engaging margins of the film.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

In the drawings:

FIGURE 2 is an elevational view of a cam for the assembly of FIGURE 1 and having a conventional profile;

FIGURE 3 is a view similar to FIGURE 2, however, showing a modified cam profile;

FIGURE 4 is a view similar to FIGURE 2 showing still another cam profile;

FIGURE 8 is a chart comparing the angular expanses required in shutter blades of strip film feeding mechanisms operated by the cams of FIGURES 2, 3 and 4.

Figure 1:
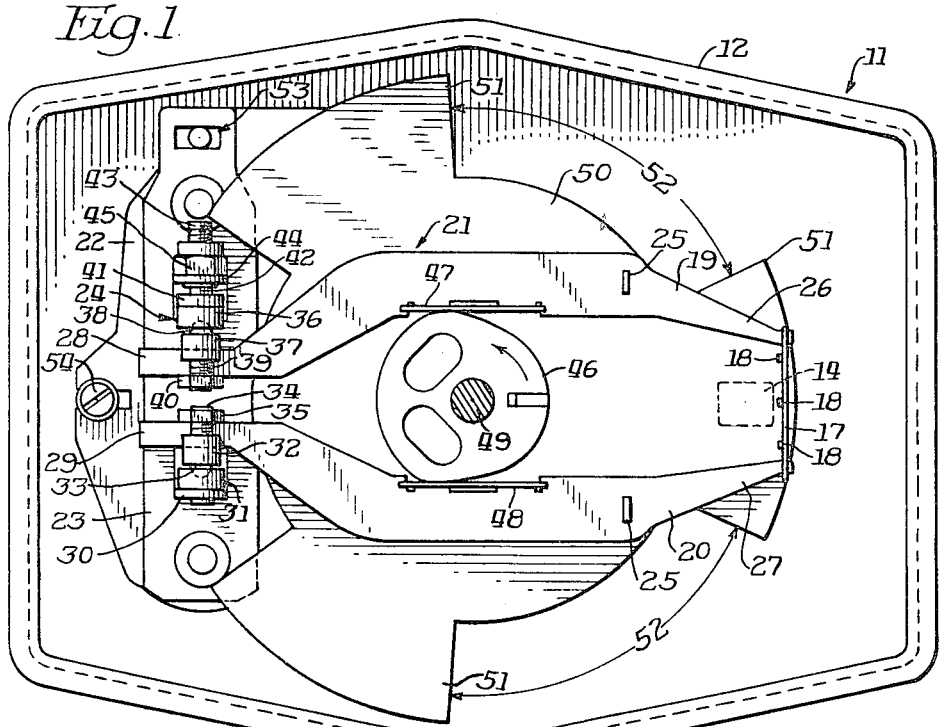
FIGURE 1 is an elevational view of a cam assembly arranged in a film projector to actuate an intermittent strip feed mechanism of the reciprocating type and looking toward the front of said projector.
Figure 5:
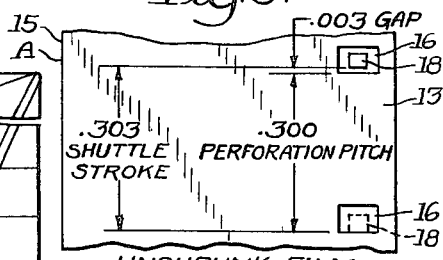
FIGURE 5 is a view in the nature of a schematic representation of a segment of an unshrunk film strip.
Figure 6:
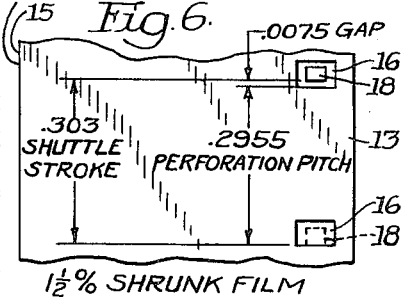
FIGURE 6 is a view similar to FIGURE 5, however, showing the film strip shrunken.

Referring to FIGURE 1, there is shown a portion of a motion picture film projector generally designated 11 and comprising a housing 12 having a usual projection opening 14 (shown covered in FIGURE 1). A film strip 15, fragments of two variations A and B of which are shown in FIGURES 5 and 6, respectively, comprises a plurality of connected together transparency frame 13, of uniform height, which are adapted to be intermittently drawn through said housing for indexing or registration with said aperture 14 to give the illusion of continuity of motion between the images of successive frames.

The film strip 15 has a plurality of customary marginal perforations 16 which are uniformly spaced each from another a distance equal to the height of a frame to facilitate indexing. A cam operated shuttle 17, provided with a plurality of customary feed teeth of claws 18 which are vertically spaced apart a distance equal to frame height, is mounted to reciprocatively cause the claws 18 to engage in successive apertures 16 to feed or advance the film strip in a usual manner, a frame at a time.

For that purpose, the shuttle 17 is carried on end portions 26 and 27 of a pair of arms 19 and 20 which are arranged in fixed apart spaced relationship as a positively confining cam follower in the form of a frame 21. A vertically disposed support plate 22 is adjustably mounted within the housing 12 adjacent the opposite end portions 28 and 29 of arms 19 and 20; and a mounting member 23 is carried by said plate 22. A connection mechanism generally designated 24 and defining the axes about which frame 21 is rockable is carried by the mounting member. Said connection mechanism facilitates reciprocating the frame 21 about a horizontal axis to produce vertical film strip movement for indexing and about a vertical axis to engage and disengage the claws 18 in and from the perforations 17 prior to and after each indexing stroke. To reciprocate frame 21 about a vertical axis, motivating means (not shown) exert an alternating force on arms 19 and 20 through suitable connector means 25. The present invention does not concern itself with such unseen motivating means and therefore further description thereof is omitted.

The connection mechanism 24 comprises a lower shelf or ledge 30 which may be struck or lanced from the mounting member 23. A ball seat 31 having an upwardly opening concavity or socket is carried on said ledge 30. A boss 32 has its lower end fashioned as a hemisphere, the latter element being proportioned for and universally rotationally engaged in the socket of said ball seat. An integral externally threaded shank 34 projects upwardly from said boss 32 and defines the vetrical axis of rotation. The end portion 29 of the arm 20 extends through a common vertical slot (not shown) in the shank 34 and the boss 32. A nut 35 is screw threaded on the shank 34 into engagement with the arm extension 29 to rigidly secure the latter member to the shank 34 and the boss 32.

The connection mechanism 24 has a similar and upper facing construction to anchor arm extension 28. The latter construction comprises a plastic ball cap 36 which defines a downwardly opening concavity or ball socket. A hemispherical member 38 is proportioned for and universally rotationally engaged in the socket of said ball cap. Said hemispherical member 38 herein is shown as an upwardly extending projection of a boss 37. An externally threaded vertical shank 39, which defines the vertical axis of rotation, comprises an integral downward extension from the boss 37. Said last mentioned shank and boss are provided with a common vertical slot in which the arm end portion 28 engages. A nut 40 which is screw threaded on the shank 39 rigidly secures said arm end portion 28 to the shank 39 and boss 37. The head part 41 of what may be considered an inverted screw-like member 42 is rigidly secured to the upper surface of the ball cap 36. The screw-like member 42 has an externally threaded shank 43 which extends vertically upwardly through a rearwardly projecting ledge or shelf 44 which may be struck or lanced from the plate 24. A nut 45 is screw threaded on the shank 43 against the ledge 44 and serves to tension the frame 21.

The frame 21 is reciprocative upwardly and downwardly as well as inwardly and outwardly on the hemispherical members 33 and 38, for the purpose of sequentially indexing the film strip 15. A cam 46 having an external profile akin to the cams of the class referred to as "heart-shaped," is responsible for the upward and downward movement of the frame 21 and accordingly the shuttle 17. The cam is operative on intermediate portions of the arms 19 and 20 through the medium of bearing members 47 and 48, respectively. Said bearing members are disposed between said arms and said cam and have bearing engagement with the cam for reciprocation of the arms and the shuttle 17 for longitudinal feeding of film strip 15.

The parts are proportioned in a manner such that each frame 13 can register with the projection opening when brought into projection position. To the end that initial adjustment or framing may be made to obtain proper frame registration, an adjusting mechanism 53 (FIGURE 1) including a pivot 54 is provided for rocking the plate 22 and the cam follower frame 21. However, the details of construction of the adjusting mechanism 53 are not limiting on the present invention and accordingly further description is omitted.

A driven suitably journalled cam shaft 49 serves to rotate the cam 46. A flat shutter 50 is secured to said cam shaft 49 for co-rotation therewith in a plane parallel to the frame 21 between said shuttle and the aperture 14. The shutter 50 is provided with three conventional flicker blades 51 which are symmetrically arranged for the conventional purposes, namely that of alternately and intermitently blocking light from passing through the aperture 14 during each cam cycle during film strip translocation and preventing flicker, in a manner known in the art. The angular expanses 52 between said flicker blades uncover opening 14 as shutter 50 rotates and are of an extent calculated to permit passage of sufficient light for proper viewing of successive film frames brought into registration with the aperture 14.

Illustrated in the drawings is a sixteen millimeter projector 11, having a normal projection rate of 24 frames per second. For effective management of the film strip 15 which the projector is adapted for exhibiting, the illustrated cam 46 has a constant diameter of 1.2616 inches with a cam stroke of .1416 inch. By reason of the pivotal mounting of the cam follower frame 21, the cam stroke is translated into a shuttle stroke of .303 inch. In FIGURES 5 and 6, the shuttle stroke is illustrated by showing in solid lines the relative position of a claw 18 at the initiation of an indexing stroke, and showing in dotted lines the relative position of such claw at the end of an indexing stroke.

8he pitch of the perforations 16 in unshrunk film variation A for use in the projector with the aforesaid characteristics is .300 inch, assuming one perforation per frame. Therefore, in film which is properly framed at the beginning of each indexing stroke, with respect to film strip variation A, there will exist a gap of .003 inch between each claw 18 and the downstream margin of perforation 16 in which such claw is engaged (upper right of FIGURE 5). The purpose of the gap, of course, is to permit clearance by the claws 18 of the margins of the perforations 16 as the former move into indexing mesh with the film 15. As each claw moves through its indexing stroke, (from the solid to the dotted line positions illustrated in FIGURES 5 and 6) the gap will be closed. Engagement of conventionally reciprocated claws 18 with the margins of perforations 16 upon closing of the gap causes a slapping noise and also tends to damage the film.

These undesirable effects, when using conventional means, are further magnified as the film shrinks. In normal usage, film may shrink as much as 1½%, as shown in film strip variation B (FIGURE 6). In such event, the gap between each claw 18 and the downstream margin of its perforation could increase to as much as .0075 inch (upper right of FIGURE 6). The operational hazards from the undesirable effects are better appreciated when one considers that the acceleration of a conventional cam 46 increases, almost instantaneously, from zero at the initiation of the film indexing stroke to 14,645 inches/second$^2$. This latter dimension, when translated into shuttle acceleration, will be greater, in the illustrated projector, in proportion to the ratio of the distances of the shuttle 17 and the center of cam 46 to the center of pivot of the cam follower frame 21.

A cam 46 of the type conventionally employed for shuttle reciprocation is variously referred to as a Lumier cam, triangle cam, heart-shaped cam, circular arc, or symmetrical cam and is considered as being of constant width, i.e., the straight line distance between each pair of followers engaging points is the same as that for any other pair. Such cam is driven at a constant rate and provides in one revolution two throw periods of equal duration each of which is followed by a dwell period, the length of which is the same as the length of the other thereof. A standard cam 46 for operation of the illustrated projector 11 is shown in FIGURE 2. The cam design of FIGURE 2 is considered symmetrical because the shape or profiles of the throw surfaces 62 and 63 on opposite sides of each dwell are alike.

Cam 46 is defined by a pair of concentric dwell surfaces 60 and 61 generated on radii R1 and R2 from the center of shaft 49. The difference in the radii R1 and R2 is equal to the cam stroke. Disposed between said dwell surfaces are a pair of like dimensioned throw surfaces 62 and 63 which are circular arcs whose projections from one end of each thereof intersect opposite ends of dwell surface 60. Said throw surfaces at their other ends merge with the dwell surface 61 (of smaller radius R2) by reason of tangency therewith. Said throw surfaces are merged into the dwell surface 60 (of larger radius R1) by a pair of small blending surfaces 64. The latter surfaces have radii of curvature of equal length, each of which is equal to the thickness of cam fabric extending eccentrically from a triangular point 65, relative to which cam 46 is generated, to the cam periphery. Each of said throw surfaces has a radius of curvature R3 concentric with the blending surface 64 of the opposite throw surface.

A suitable cam 46 for operation of projector 11 may have a pair of dwell surfaces 60 and 61, each having an angular expanse of 126°, and a pair of throw surfaces 62 and 63, each having an angular expanse of 54°. It has been determined that for suitable projector function, a conventional cam, dimensioned as aforesaid, requires three flicker blades 51, each having an angular expanse of 50°. As indicated in the third column of FIGURE 8, such proportioning provides projection light black-out totaling 41.7% during each cam cycle and corresponding light transmission of 58.3%. From FIGURE 7, it is seen that a conventional cam (curve labeled "cam 46") increases its speed, relative to the extent of cam thrust (cam displacement), at a more rapid rate than do a pair of other cams to be defined in ensuing description (the characteristics of which are shown by curves labeled "cam 46A" and "cam 46B"). Moreover, it is seen from FIGURE 7 that at the time the gap between a claw 18 and unshrunk film is closed, the indexing speed of the cam 46 is almost 6 inches/second. Furthermore, should the film shrink as much as 1.5% (variation B), the speed of the cam at the time of gap closure would be at least ten inches/second. Under these last circumstances, consider the beating which is taken by the film 15 about the perforations 16 during indexing.

The other cams 46A and 46B are shown, respectively, in FIGURES 3 and 4. They are of constant width and, except to the extent indicated, they may be of the same construction, design and profile as cam 46. In accordance with the present invention, the cams 46A and 46B can be substituted in projector 11 for a conventional or standard cam 46 to minimize slapping noise and film wear.

In cam 46A, the expanse of each of the dwell arcs is reduced to 110° from that of cam 46 and the portion 71 of the throw surface has an angular expanse of 170°. Such reduction results from the inclusion in the throw surface of the portion 71 which gives rise to the initial stage of the cam stroke with low acceleration, with the restriction that the overall size of the cam can be the same as in the cam 46. The cam is made asymmetric by eliminating the equivalent of the portion 71 at the downstream end of the throw surface, which would have given rise to a final stage of cam stroke with slow deceleration but which is redundant and would have further reduced the dwell angle. The surface portions 71 are included as upstream ends of adjoining throw surfaces by generating a pair of circular arcs for opposite angular sections 70. Each circular arc defining a surface portion 71 has a radius of curvature R4, and is tangent to the adjacent dwell surface. Each last arc intersects an adjacent throw surface to which it is suitably blended. The apices of the opposite angular sections 70 are on the center of curvatures 75 of the surface portions 71, the radii R4 being calculated for suitable blending of surfaces 71 in the cam profile and for reduction of cam acceleration at the beginning of the cam throw period.

Observation is made that the angular direction in which the cam is rotatable for film indexing will determine the sides of the throws on which the surfaces 71 are introduced. Presently, it is assumed that indexing occurs upon counterclockwise rotation of the cams with respect to FIGURES 2, 3 and 4. Accordingly, with respect to FIGURE 2, upstream throw cam points 73 and 74 will be carried into engagement with the follower frame 21 at the initiation of each indexing stroke. Therefore, surface portions 71 are disposed to the left (upstream) of the points 73 and 74 with respect to FIGURE 4.

Figure 7:
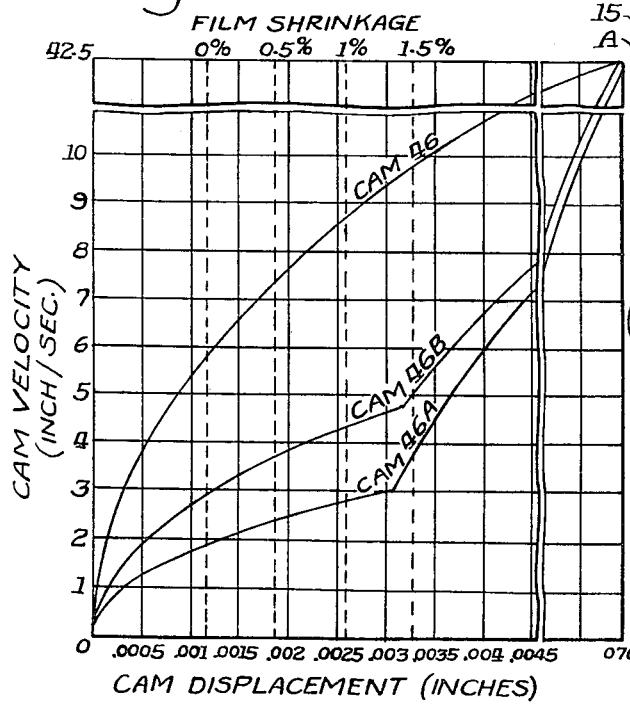
FIGURE 7 is a graph comparing the velocities of the cams shown in FIGURES 2, 3 and 4 with the magnitudes of the displacements of their followers at various percentages of film strip shrinkage.

Using cam 46A slapping noise due to engagement of film and shuttle claws is completely abated. The dramatic result is understood when FIGURE 7 is considered. As shown there, when cams 46 and 46A attain displacement equal to half (.0708 inch) an indexing stroke, they are travelling at about the same speed. However, during initial portions of the shuttle strokes, the speed of cam 46A is much less than the speed of cam 46. For example, when there has been no film shrinkage, the speed of cam 46A at the time of shuttle tooth engagement with the film will be less than 2 inches/second, while the speed of cam 46 will be about 6 inches/second. When the film has shrunk 1.5%, the speed of cam 46A at the time of engagement of the shuttle with the film will be less than 4 inches/second whereas, the speed of cam 46 will be greater than 10 inches/second.

From FIGURE 8, it is seen that with cam 46A, flicker blades 51, each having an angular expanse of 59° and causing a black-out period of 49.2% during each cam cycle, transmit light only during 50.8% of each cycle. It has been determined that 59° flicker blades are required to eliminate flicker in projector 11 when using cam 46A. However, by some standards the light transmission characteristics are considered as marginal. To overcome this last objection, cam 46B (FIGURE 3) is provided. While from the standpoint of noise abatement cam 46A is ideal, cam 46B minimizes noise to a tolerable level.

Cam 46B differs from cam 46A in that its dwells are 118° and its throws are 62°. As a result, dwell segments 80 (these correspond to dwell segments 70) have an angular expanse of 11½°. Consequently, 11½° throw segments defined by circular arc surfaces 81 are added to each of the throw segments of cam 46. Each of circular arc surfaces 81 is generated from a radius R5 whose center is at 85. Radius R5 is calculated for best proportioning such last surfaces for blending to the adjoining throws and minimizing cam acceleration upstream of each throw.

The proportions and profile of cam 46B dictate shutter blades 51, each having an angular expanse of 55° for adequate flicker control. As shown in FIGURE 8, this permits light transmission during 54.2% of each cam cycle. That amount is fully adequate for film projection by all standards. Moreover, as illustrated in FIGURE 7, the speed of cam 46B, at time of shuttle engagement during indexing with film which has shrunk as much as 1.5%, is but 5 inches/second. This is about 17% less than the speed of cam 46 at the time it engages unshrunk film and causes only almost imperceptible slapping noise.

It is to be understood that the embodiments shown are illustrative of the principal operation of an intermittent strip feed mechanism and that certain changes, alterations, modifications or substitutions can be made in the structure of the device without departing from the spirit and scope of the claims.

What is claimed is:

1. A constant width cam adapted for rotation about a fixed axis for up and down reciprocation of a cam follower having a pair of opposed cam engageable members spaced apart in fixed relationship, said cam having a pair of peripherally spaced oppositely disposed concentric circular arc dwell surfaces of equal angular expanse, and a pair of oppositely disposed unsymmetrical circular arc throw surfaces of equal angular expanse and including a first portion of each throw surface having equal radius with a common center disposed between and contiguous with said dwell surfaces to provide a cam profile for continuously and simultaneously engaging said cam engageable members to accelerate the follower at a slower rate during the first portion of its stroke than during the later portion thereof.

2. A constant width cam as defined in claim 1 in which the first portion of each throw surface has a center of curvature different from the center of curvature of another portion contiguous therewith.

3. A constant width cam as define in claim 1 in which the first portion of each throw surface has a radius of curvature different in length from the radius of curvature of another portion contiguous therewith.

4. A constant width cam as defined in claim 3 in which each dwell surface alternates with a throw surface and each throw surface alternates with a dwell surface.

5. A constant width cam as defined in claim 4 in which the ends of the throw surfaces contiguous with each dwell surface are of varying configuration.

6. A constant width cam as defined in claim 4 in which the upstream end of each throw surface is of different configuration and proportioned for slower cam displacement than its downstream end.

7. A constant width cam as defined in claim 3 in which each throw surface is defined by at least three circular arcs of varying radii so that cam displacement during the first half of the cam stroke is at a slower rate than during the last half thereof.

References Cited

UNITED STATES PATENTS

| | | | |
|---|---|---|---|
| 1,266,148 | 5/1918 | Otis | 74—567 |
| 1,289,243 | 12/1918 | Otis | 74—567 |
| 1,912,535 | 6/1933 | Mitchell | 74—567 XR |
| 2,029,930 | 2/1936 | Martin | 74—567 XR |
| 2,569,487 | 10/1951 | Mitchell | 74—567 XR |

OTHER REFERENCES

Shaw, F. W.: Dwell Cams of Uniform Diameter, in Mechanical World and Engineering Record, London, 1935, vol. 98, pp. 329–330.

FRED C. MATTERN, Jr., Primary Examiner

F. D. SHOEMAKER, Assistant Examiner